Aug. 1, 1961 G. A. MARSH 2,994,778
CORROSION RATE PROCESS AND APPARATUS
Filed Sept. 10, 1957 2 Sheets-Sheet 2

INVENTOR.
GLENN A. MARSH
BY *Edward H. Long*
ATTORNEY.

United States Patent Office 2,994,778
Patented Aug. 1, 1961

2,994,778
CORROSION RATE PROCESS AND APPARATUS
Glenn A. Marsh, Crystal Lake, Ill., assignor to The Pure Oil Company, Chicago, Ill., a corporation of Ohio
Filed Sept. 10, 1957, Ser. No. 683,056
9 Claims. (Cl. 250—106)

This invention relates to a method and apparatus for investigating the corrosion rate of corrosion-sensitive materials of construction disposed in not readily-accessible positions and exposed to a continually flowing, fluid stream. It is more specifically concerned with the use of radioactive tracers for investigating the corrosion rate of materials of construction exposed to a corrosive environment within a well bore traversing a fluid-producing, geological formation.

According to this invention the corrosion rate of a material of construction exposed to a corrosive, continually flowing, fluid stream is measured by positioning in the fluid stream a container holding a radioactive substance which is preferably soluble in the flowing stream. At least a section of the side walls of the container is fabricated from a corrosion-sensitive material of construction of known thickness such that perforation resulting from corrosion will occur within a desired time. Under the attack of the surrounding, corrosive fluid a portion of the corrodible container side walls will give way permitting the radioactive fluid held in the container to be introduced into the surrounding, flowing stream. The presence of the radioactive material in the stream can be detected by disposing a radioactivity detector in a suitable position in the flow conduit. The corrosion rate can then be determined by correlation of the original wall thickness of the corrodible section of the capsule with the time required for the release of the radioactive material.

Because of the empirical nature of the corrosion mechanism, corrosion inhibition can best be investigated by exposing selected materials of construction to a corrosive environment. The corrosion rate of the corrodible material is observed by various techniques such as weight-loss determinations and the like which require retrieving the corrosion-test specimens and weighing them after a specified time. These procedures can conveniently be carried out where the corrosive environment being investigated is located in an accessible place. In places, however, which are not readily accessible, preferably must be employed devices which are adapted to permit the remote monitoring of the corrosion rate. In addition, the conventional weight-loss techniques do not yield a meaningful determination of the rate at which pitting corrosion occurs.

Exemplary places which are not readily accessible for the study of corrosion conditions are the bore holes of wells penetrating or traversing fluid-producing, geological reservoirs. Because of the heterogeneous nature of the corrosion conditions which exist within the bore hole or adjacent the formation, accurate corrosion-rate investigations are necessary to permit suitable designs of well casings, pumps, or other bore hole accessories disposed in the bore hole. Accordingly, it is the object of this invention to provide a method and apparatus which will permit a study of the corrosion rate of materials of construction exposed to corrosive conditions in remote locations not readily accessible by employing radioactive tracers. It is a further object to study the corrosion rate of materials of construction disposed in well bores by the use of radioactive tracers. These and other objects will become more apparent from the following detailed description of this invention.

According to this invention, a radioactive compound soluble in the fluid stream whose corrosivity is being investigated is encapsulated in a container. At least a portion of the wall of the container is prepared from a material whose corrosion rate is to be determined. The wall thickness of the metal is chosen such that perforation resulting from corrosion will occur within a desired length of time. When perforation does occur the radioactive material escapes from the container, commingles with the flowing stream and is carried through the fluid conduit to an appropriate place where its presence is detected by a radioactivity monitor. By knowing the original thickness of the corrodible section of the container wall and by determining the time required for the release of the radioactive material into the flowing stream the corrosion-rate can be determined.

Although the instant invention has a plurality of applications in various types of installations, in order to facilitate the following description of the invention, its use in determining the corrosion rate of a corrosive material of construction disposed in a well bore through which is flowing a corrosive stream of hydrocarbons and impurities concomitantly produced therewith from a subterranean, geological reservoir will be considered specifically.

Figure 1:
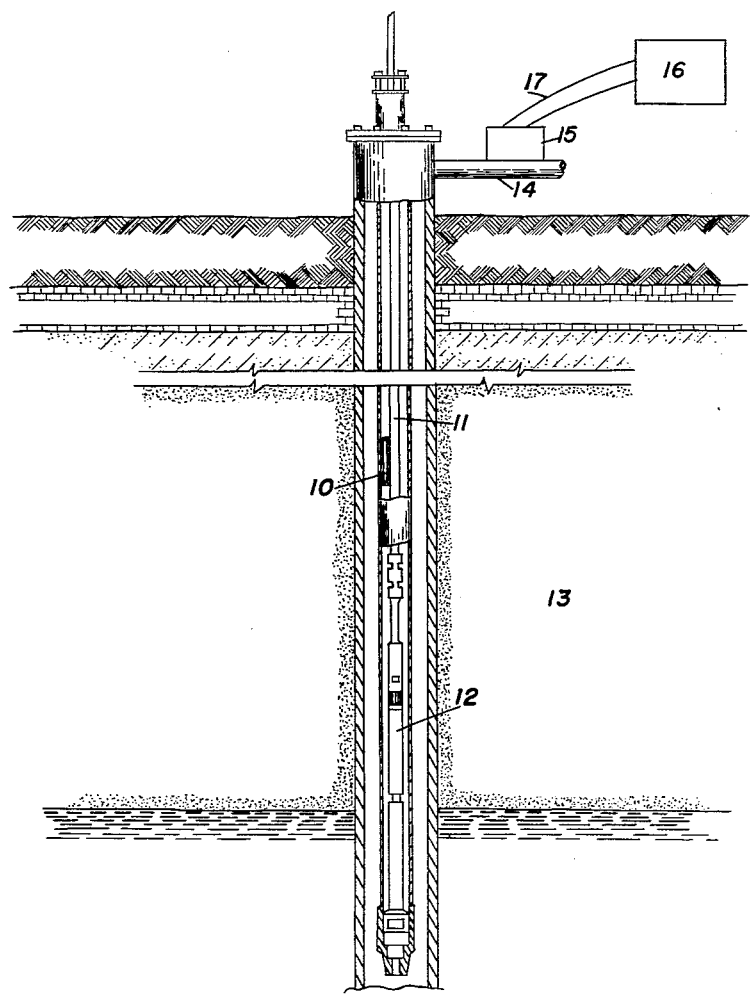
FIGURE 1 is a schematic diagram illustrating the use of the instant invention for determining the corrosion rate at the bottom of a well producing hydrocarbon fluids.
Figure 2:
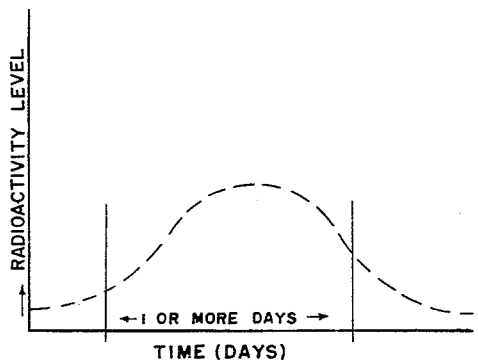
FIGURE 2 is a graphical presentation which will be produced by the radioactivity monitor disposed in a conduit through which the radioactive fluid is flowing.

Illustrated in FIGURE 1 is a typical arrangement of standard equipment for pumping oil from a well bore employing a rod-actuated pump. In carrying out the instant invention a test container 10 is secured to a sucker rod 11 which is actuated by a "walking beam" device, not shown, thereby operating pump 12 disposed adjacent a productive oil sand 13. The corrosivity of the produced, well fluids will in time result in the penetration of the container wall allowing the radioactive chemical contained therein to escape into the produced fluid and impart detectable radioactivity thereto. The radioacivity-containing fluid is discharged through lead line 14 adjacent which is placed a radioactivity detector 15 connected to integrating and recording means 16 by electrical conductors 17. If a recording instrument is employed in conjunction with the measuring circuit, a graphical manifestation such as that illustrated in FIGURE 2 will be obtained.

Figure 3:
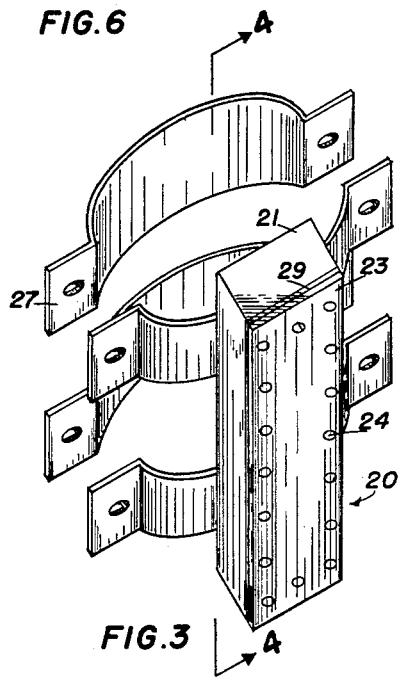
FIGURE 3 is an isometric view of a typical container employed in the process of this invention.

As an illustrative example, a steel container as shown in FIGURE 3 having a compartment 19.3 cc. in volume was filled with a solution containing radioactive iodine in a concentration sufficient to provide an activity of 5 millicuries per milliliter. The compartment is sealed with a foil-like strip 24" x 1½" x 0.001" and the container installed in a well producing 100 barrels/day of an admixture of petroleum oil and brine. After 15 days the foil test specimen is perforated thereby releasing radioactive iodine into the produced fluid. The radioactivity of this fluid is measured employing a conventional Geiger-Mueller counter which is installed in the flow lines at the well head. Penetration within this interval indicates a penetration rate of 0.024 inch per year.

Shown in FIGURE 3 is an illustrative container adaptable for being securely positioned on a sucker rod employed to actuate a pump disposed in a well bore.

This container 20 comprises a unitary body portion 21 having a compartment 22 formed by the sidewalls and back of the body portion. Fitted to the front of the body portion is a replaceable diaphragm 23 which is held in place by suitable thread fasteners 24. A gasket 29 is installed between the face of the body portion and the replaceable, test-specimen diaphragm to provide a fluid-tight seal. To protect the thin-walled diaphragm from mechanical damage from sand scouring or the like, a perforate shield 25 is mounted over the diaphragm face of the container. The container is held securely on the reciprocative, sucker rod 26 by a suitable clamping means such as opposed, U-shaped brackets 27. To avoid galvanic corrosion, the entire container, including the clamping means, should be fabricated from the same material of construction. In addition, it is also preferred that an insulating spacer 28 be provided between the sucker rod and the clamping means for this same reason. In this preferred embodiment the compartment contains the radioactive material.

Figure 7:
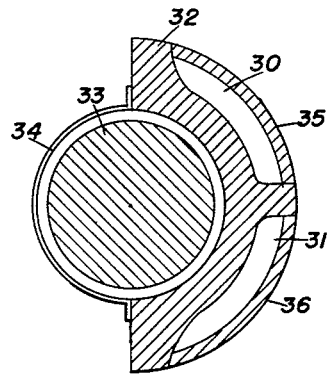
FIGURES 6 and 7 are alternative embodiments of containers for holding a radioactive fluid for use in the instant invention.
Figure 5:
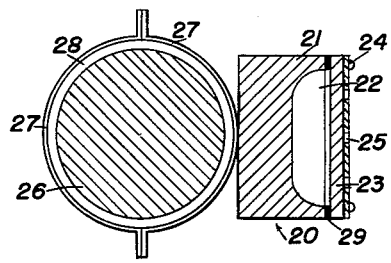
FIGURE 5 is a cross-sectional view taken along lines 5—5 of FIGURE 4.
Figure 6:
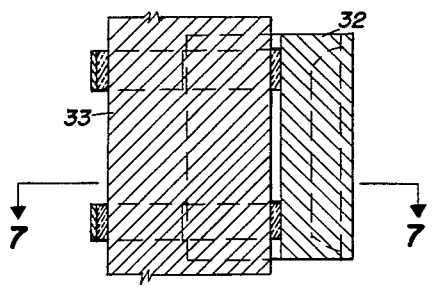
Figure 4:
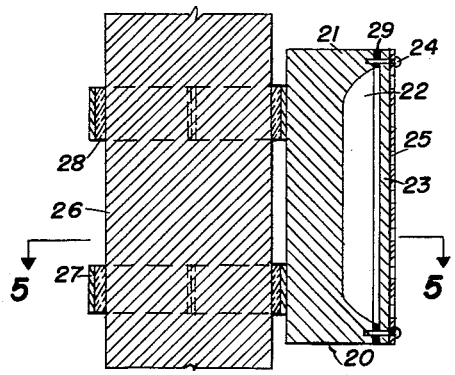
FIGURE 4 is a cross-sectional view taken along lines 4—4 of FIGURE 3.

Another embodiment of the container element employed in carrying out the instant invention is shown in FIGURES 6 and 7.

In this type of corrosion-test assembly two compartments 30 and 31 are provided in body portion 32 which is shaped to conform with the semi-circumference of the sucker rod 33 to which it is attached by clamp arm 34. In this design the thicknesses of the test walls 35 and 36 on each half of the container are different in order that a corrosion time curve can be obtained by observing the times at which the two peaks of radioactive level are found in the produced fluid. The use of multi-walled containers, inter alia, will permit the study of the effectiveness of corrosion inhibitors if the compartments are arranged so that access to the inner compartment is possible only by penetrating the outer compartments, as in a concentric arrangement of annular compartments. In these designs, after the outer wall has perforated and the radioactive contents of the outer chamber have been emptied and detected, an inhibitor can be injected down the hole and its effectiveness determined by observing how much longer it takes the second wall to perforate.

From the alternate, non-limiting illustrations it is seen that other designs for a container having at least one corrodible wall or section thereof will be obvious to those skilled in the art. While it is preferred that the corrodible test specimen be attached to the main body of the container by means of threaded fasteners, in order that the container can be re-used in investigating the corrosion rate of other corrosive systems, it is also possible to attach the corrodible-wall test-section to the body of the container by soldering, brazing, welding, or other similar techniques. In general, the container design will depend upon the application in which the apparatus of this invention is being put to use. Factors such as the nature of the corrosive environment, the type of flow system and the physical nature of the installation must be taken into consideration in providing a suitable container. It is obvious that the fluid content of the container should be sufficient to incorporate in the flow system detectable amounts of a radioactive tracer.

To insure detection, the flowing fluid stream must contain at least about 0.4 millicurie of radiation per liter. For example, when employing the instant invention in investigating the corrosion rate of materials of construction exposed to well fluids produced from subterranean reservoirs where the fluid is being produced at the rate of about 100 barrels per day, an amount of 12 millicuries will provide a detectable level for two days. If a compound containing radioactive iodine is used, 2-4 times this 12 millicurie level is initially employed, depending on how long the container lasts before releasing the iodine. Initially radio-iodine provides 5 millicuries per milliliter, and as a guide, the initial amount of activity placed in the capsule can be determined by the following equation:

$$I = (0.06P)(2^R)$$

where:
$P$ = production in bbl./day
$R$ = number of 8-day periods estimated before perforation will occur
$I$ = mullicuries It is evident that other similar formulae can be prepared for other types of flow systems. Accordingly, for use with radioiodine or other radioactive tracers, suitable containers should have a volume between about 2 to 20 cubic inches; however, containers having a volumetric capacity outside this range can be used if desired. The corrodible wall section will have a sufficient thickness to provide a manifestation of corrosion rates due to pitting within a desired length of time. Depending upon the corrosive conditions, the desired exposure time, etc., a wall thickness between about 0.0005 to 0.00005 inch is preferred. Other thicknesses, however, can be employed, if desired, depending upon the design of the container. The materials of construction employed in preparing the container element of the apparatus will of course depend upon the nature of the corrosive environment. The corrodible section of the container constituting the test specimen will be prepared from a metal whose corrosion resistance is to be investigated. If a replaceable diaphragm construction is used in the manufacture of the container, the body portion of the container will be fabricated from a corrosion-resistant material such as Monel metal, stainless steels, titanium, or other metals which are highly resistant to corrosion. If the test specimen differs in composition from the selected material employed in fabricating the body portion, precaution should be taken to prevent galvanic corrosion between these apparatus elements. The container is secured in the flow system by any suitable means including conventional clamping devices or high strength magnets such as the Alnico type magnet, which can be used if the flow system is enclosed by ferrous metal containing walls. For gas-lift wells, condensate wells, and other wells which have no sucker rods, containers can be lowered to the bottom of the well on a wire line to yield the same results as discussed above.

Because isotopes with suitable half-lives and radiation characteristics are known for many of the common elements, a practically unlimited number of substances are available for use as radioactive tracers for filling the compartment section or sections of the container. Although various types of energetic radiation are emitted by radioactive materials, only those radioactive isotopes which emit beta and/or gamma radiation are commonly used in tracer work because many counter devices require that the energetic radiation pass through a material of construction embodied in the counter before it can be detected. These types of counters thereby preclude the use of radioactive isotopes which emit alpha particles because these particles have too limited a penetrating power. This does not preclude the use of alpha particle emitters. It is preferred, however, that radioactive tracers which emit beta and/or gamma particles be utilized in carrying out this invention. The radioactive material chosen should not be excessively dangerous, should be in a form that is soluble in the fluid system which is being studied, should be readily detectable with simple equipment, and should have a relatively short half-life. There is commercially available a wide variety of chemicals which can be used, per se, in radioactive tracer study. Radiochemicals containing such isotopes as iodine—131, phosphorous—32, sulfur—35, carbon—14, and deuterated compounds are commercially available.

Specific compounds which can be used, depending upon the nature of the corrosive flowing fluid, include but are not limited to barium carbonate-$C^{14}$, benzoic acid-7-$C^{14}$, naphthalene-1-$C^{14}$, sodium acetate-1-$C^{14}$, sodium bicarbonate-$C^{14}$, sodium carbonate-$C^{14}$, urea-$C^{14}$, amyl iodide-$I^{131}$, iodinated oils, e.g. lauryl iodide-$I^{131}$, stearyl iodide-$I^{131}$, potassium iodide-$I^{131}$, disodium phosphate-$P^{32}$, tricresyl phosphate-$P^{32}$, carbon disulfide-$S^{35}$, ethyl mercaptan-$S^{35}$, sodium sulfite-$S^{35}$, methanol-$H^3$, ammonium carbonate-$H^3$, ammonium nitrate-$H^3$, sodium hydroxide-$H^3$, sulfuric acid-$H^3$ and others.

It is preferred that the radiochemical selected be soluble in the flowing, fluid stream being studied to facilitate the immediate introduction of the tracer into the flowing stream as soon as access to the container compartment occurs. Depending upon the properties of the corrosive environment, the selected radiochemical can be used in its normal state, in liquid solution, or in a gaseous phase and a sufficient amount employed to completely fill the compartment. Concentrations of radiochemical required to produce about 0.4 to 0.8 millicurie of radiation per liter in the flowing stream are used.

To insure the immediate effusion of the radioactive fluid into the flowing stream upon penetration of the corrodible diaphragm, it is preferred that the compartment be completely filled with the radioactive material. This expedient is desirable in installations operating at superatmospheric pressures to avoid the use of special designs to prevent the collapsing of the diaphragm. In certain installations, however, complete filling of the compartment will not be necessary.

The counter which is employed to detect the radioactivity characteristics of the flowing stream will be selected depending upon the type of radiation which is being emitted by the flowing stream. Accordingly, scintillation type or Geiger-Mueller counters can be used. The counter is electrically connected to an auxiliary electronic circuit which controls and measures or records the voltage pulse which is produced on the anode of a Geiger-Mueller type detector by the counter discharge. Because the details of the auxiliary circuitry are outside the scope of this invention and can be obtained from standard works on counting radioactvity, they are not included herein. For example, see "Electron Nuclear Counters," Korff, Van Nostrand, 2nd edition, 1955; "Counting Tubes," Curran et al., Academic Press, 1946. These references discuss voltage power units, amplifiers, scalers, rate meters and other apparatus which can be used to translate the intensity of the radioactivity eminating from the flowing stream being scrutinized into qualitative and/or quantitative values which will permit an appropriate determination of the corrosion rate of the corrosive system under investigation.

Although the foregoing discussion of this invention has been primarily directed to the use of the instant invention in investigating the corrosion rate of metallic materials of construction exposed to the corrosive well fluids produced from a subterranean reservoir, it is evident that the invention has other applications in studying the corrosiveness of other fluid streams confined within suitable process equipment. These include but are not limited to corrosion studies of process vessels employed in the chemical industries, metallic conduits used in transporting fluids, and other enclosed systems containing flowing, fluid streams which will carry the radioactive tracer to a convenient point of detection. The flowing stream in these systems can be either liquid or gaseous in nature. Accordingly, it is intended that this invention be limited only in the manner specifically set forth in the following claims.

I claim as my invention:

1. A container assembly for studying the corrosion rate of a corrosion-sensitive material of construction exposed to a flowing, fluid stream, which comprises a body portion having sidewalls forming a compartment, a closure having at least a portion thereof consisting of said corrosion-sensitive material of not more than .001 inch thickness, and cooperating with said sidewalls to provide a fluid-tight compartment, a radioactive compound dispersible in said flowing stream disposed in said compartment and means for retaining said container in a substantially stationary position within said fluid stream.

2. A container assembly for studying the corrosion rate of a corrosion-sensitive material of construction exposed to a flowing, fluid stream which comprises a body portion having sidewalls forming a compartment, a foil-like closure of not more than .001 inch thickness fabricated from said material of construction cooperating with said sidewalls to provide a fluid-tight compartment, a radioactive compound dispersible in said flowing stream disposed in said compartment and means for retaining said container in a substantially stationary position within said flowing stream.

3. A container assembly for studying the corrosion rate of a corrosion-sensitive material of construction exposed to a flowing, fluid stream which comprises a body portion having sidewalls forming a compartment, a replaceable, foil-like closure of not more than .001 inch thickness fabricated from said material of construction cooperating with said sidewalls to provide a fluid-tight compartment, a radioactive compound dispersible in said flowing stream disposed in said compartment and means for retaining said container in a substantially stationary position within said flowing stream.

4. A container assembly for studying the corrosion rate of a corrosion-sensitive material of construction exposed to a flowing, fluid stream, which comprises a body portion having sidewalls forming a compartment, a replaceable, foil-like closure of not more than .001 inch thickness fabricated from said material of construction cooperating with said sidewalls to provide a fluid-tight compartment, a radioactive compound dispersible in said flowing stream disposed in said compartment in an amount sufficient to impart to said flowing stream a radioactivity level of at least about 0.4 millicurie/liter, and means for retaining said container in a substantially stationary position within said flowing stream.

5. A container assembly in accordance with claim 4 in which said radiochemical is soluble in said flowing stream.

6. A container assembly in accordance with claim 5 in which said radioactive chemical is an $I^{131}$ composition.

7. A container assembly for studying the corrosion rate of a corrosion-sensitive material of construction exposed to a flowing, liquid stream, which comprises a body portion having sidewalls forming a compartment, a replaceable, foil-like closure of not more than .001 inch thickness fabricated from said material of construction cooperating with said sidewalls to provide a fluid-tight compartment, a liquid solution of a radioactive chemical soluble in said flowing stream disposed in said compartment in an amount sufficient to fill said compartment, and in a concentration sufficient to impart to said flowing stream a radioactivity level of at least about 0.4 millicurie/liter, and means for retaining said container in a substantially stationary position within said flowing stream.

8. A process for determining the corrosion rate of a corrosion-sensitive material of construction exposed to a flowing, fluid stream, which comprises disposing a quantity of radioactive chemical in a container comprising a body portion having side walls whereby an enclosed, fluid-tight compartment is formed, at least a portion of said side walls consisting of said corrosion-sensitive material, disposing said container and chemical in said flowing fluid stream, supporting said container in a substantially stationary position within said flowing stream, scanning the flowing stream to determine changes in the intensity of radioactivity of said flowing stream, and correlating the original thickness of the portion of said container side wall consisting of said corrosion-sensitive material with the time required for the release of the radioactive chemical from within said compartment whereby the corrosion rate of said corrosion-sensitive material of construction can be determined.

9. A process for determining the corrosion rate of a corrosion-sensitive material of construction exposed to a flowing, fluid stream, which comprises disposing a quantity of radioactive chemical in a container comprising a body portion having side walls forming an enclosed, fluid-tight compartment and a foil-like closure fabricated from said material of construction cooperating with said sidewalls to provide a fluid-tight compartment, disposing said container and chemical in said flowing fluid stream, supporting said container in a substantially stationary position within said flowing stream, scanning the flowing stream to determine changes in the intensity of radioactivity of said flowing stream, and correlating the original thickness of the portion of said container side wall consisting of said corrosion-sensitive material with the time required for the release of the radioactive chemical from within said compartment whereby the corrosion rate of said corrosion-sensitive material of construction can be determined.

References Cited in the file of this patent

UNITED STATES PATENTS

| | | |
|---|---|---|
| 2,433,718 | Teplitz | Dec. 30, 1947 |
| 2,468,905 | Warren | May 3, 1949 |
| 2,659,046 | Arps | Nov. 10, 1953 |
| 2,770,736 | Karsnow | Nov. 13, 1956 |